No. 802,118. PATENTED OCT. 17, 1905.
G. A. SCHÖCHE.
VEHICLE WHEEL.
APPLICATION FILED JUNE 26, 1905.

Witnesses:—
Paul Arras.
Gustav Hegde

Inventor:—
Gustav Adolf Schöche
by Paul Schilling,
his attorney.

UNITED STATES PATENT OFFICE.

GUSTAV ADOLF SCHÖCHE, OF DRESDEN, GERMANY.

VEHICLE-WHEEL.

No. 802,118.   Specification of Letters Patent.   Patented Oct. 17, 1905.

Application filed June 26, 1905. Serial No. 266,987.

*To all whom it may concern:*

Be it known that I, GUSTAV ADOLF SCHÖCHE, a subject of the German Emperor, residing at Dresden, Germany, have invented certain new and useful Improvements in Vehicle-Wheels, of which the following is a specification.

The present invention has reference to improvements in vehicle-wheels, and relates mainly to a new construction of hubs for such wheels; and the object of the invention is to provide means whereby the spokes may be readily taken out separately without necessitating dismantling of the whole wheel.

Figure 1:
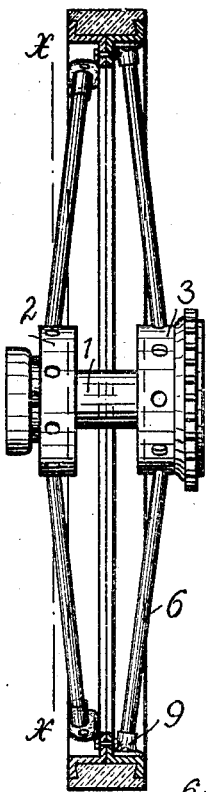
Figure 2:
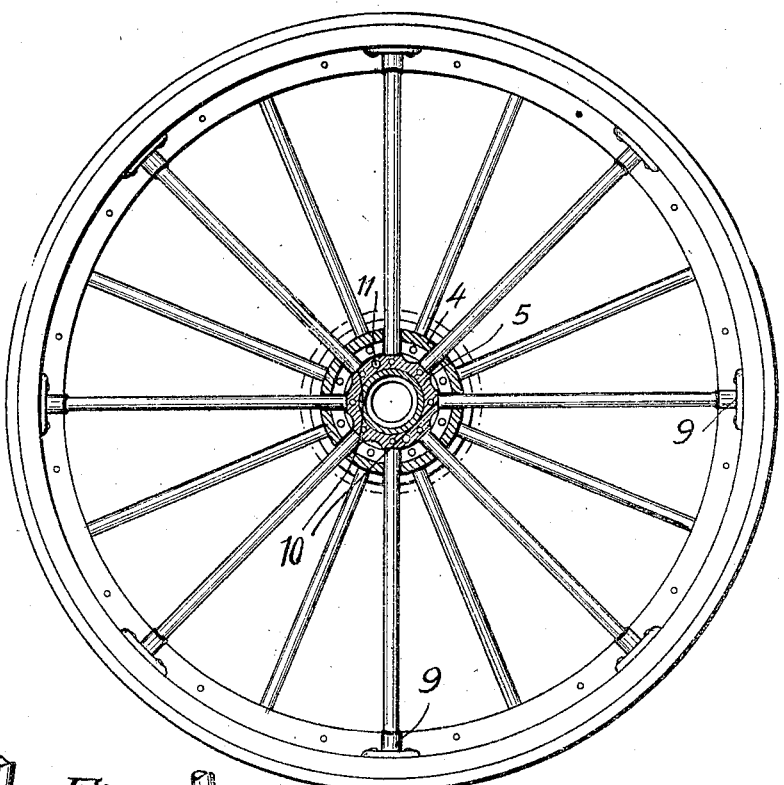
Figure 3:
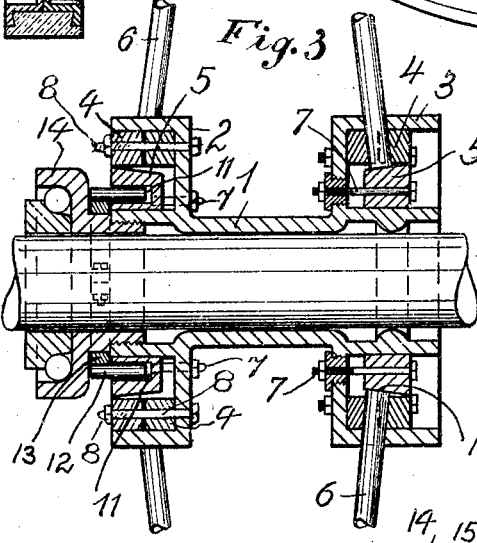
Figure 4:
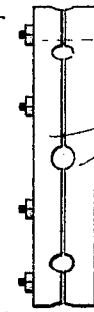
Figure 5:
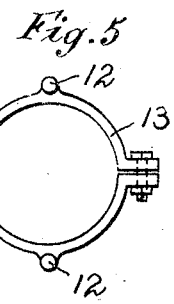
Figure 6:
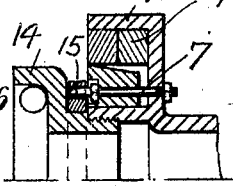

In the accompanying drawings, Figure 1 is a vertical sectional elevation of a wheel provided with my improvements with the bolts 7 and 8 removed. Fig. 2 is a side view with section through the hub on line $xx$ of Fig. 1. Fig. 3 shows a sectional elevation of the hub alone on an enlarged scale. Figs. 4, 5, and 6 are detail parts of the hub, to be hereinafter referred to.

The tubular hub box or sleeve 1 is provided at either end with an annular extension or trough 2 and 3, respectively, in which are arranged independently of one another clamping-rings 4 and wedge-rings 5. The clamping-rings 4 are sectioned, as shown in Fig. 4, and slantingly bored, as shown in Fig. 3, to receive the ends of the alternating spokes 6, and the wedge-rings 5 serve to support the inner spoke ends and force the spokes outwardly upon being tightened by means of the screw-bolts 7. Screw-bolts 8 spaced between the individual spokes hold the two halves of the clamping-rings 4 together. The outer ends of the spokes are retained in the felly by means of sockets or shoes 9. For the purpose of removing a spoke the screw-bolts 8 are eased, the screw-bolts 7 taken out, and the wedge-ring removed, when the spoke is first retracted into the hub to come free from the felly-socket 9 and then slantingly withdrawn from the hub. Each individual spoke can thus be readily removed and a new one put in place without necessitating a taking apart of the wheel, since each spoke-star by itself keeps the wheel stiff independently of the other.

In order to assure a secure rest of the spokes on the bevel face of the wedge-ring 5, the latter is provided with flattened seat portions 10, as shown in Fig. 2, so that when tightening the wedge-rings these flat seat portions always fit the correspondingly-flattened spoke ends.

The wedge-rings are provided with holes 11, Fig. 3, to receive studs 12, secured to a clamping-ring 13, which latter serves as additional hold for the ball-bearing cup 14, or the bolts 7 may be provided with an extension 15, Fig. 6, fitting into the clamping-ring 13 to keep it in position and prevent its rotation after it has been once clamped about the respective ball-bearing part.

What I claim is—

1. A vehicle-wheel comprising in combination with the axle and ball-bearings, the hub-sleeve, a trough-like annular extension on either end of said sleeve with alternately-spaced perforations for the spokes, a two-part, slantingly-bored clamping-ring in said hub-sleeve extensions, means to temporarily clamp these two parts together, a wedge-ring in said hub-sleeve extension, flattened seat portions on said wedge-ring, means for tightening said wedge-ring within said extension, and shoes or sockets on the felly to receive the outer ends of the spokes, substantially as described.

2. A vehicle-wheel comprising in combination with the axle and ball-bearings, the hub-sleeve, a trough-like annular extension on either end of said sleeve with alternately-spaced perforations for the spokes, a two-part, slantingly-bored clamping-ring in said hub-sleeve extensions, means to temporarily clamp these two parts together, a wedge-ring in said hub-sleeve extension, flattened seat portions on said wedge-ring, means for tightening said wedge-ring within said extension, a clamping-ring for additionally securing the ball-bearing cup, means for keeping said clamping-ring in position after having been clamped to the ball-bearing cup, and shoes or sockets on the felly to receive the outer ends of the spokes, substantially as described.

3. A vehicle-wheel, comprising a felly, spokes and a hub formed with angular sleeves, said sleeves formed with spoke-receiving apertures, a ring arranged within each of said sleeves, said ring comprising two sections each formed with angularly-disposed registering recesses forming sockets for the inner ends of the spokes, means clamping the sections of said ring upon said spokes, a wedge-ring arranged between said ring and hub, means passing through each of said sleeves and connected to said wedge-rings for moving the same, the inner end of said spokes bearing against said wedge-ring.

4. A vehicle-wheel, comprising a felly, spokes and a hub formed with angular sleeves, said sleeves formed with spoke-receiving apertures, a ring arranged within each of said sleeves, said ring comprising two sections each formed with angularly-disposed registering recesses forming sockets for the inner ends of the spokes, means clamping the sections of said ring upon said spokes, a wedge-ring arranged between said ring and hub, means passing through each of said sleeves and connected to said wedge-rings for moving the same, the inner end of said spokes bearing against said wedge-ring, a bearing-cup, and a sliding connection between the same and one of said first-named rings to prevent relative rotation of said bearing-cup.

5. In a wheel, the combination with the spokes, of a hub, a bearing member for said hub, spoke-tightening means, means connecting the said bearing member and spoke-tightening means for simultaneous rotary movement, and means for moving the spoke-tightening means independently of said bearing member.

In testimony whereof I affix my signature in presence of two witnesses.

GUSTAV ADOLF SCHÖCHE.

Witnesses:
PAUL ARRAS,
C. H. SCHILLING.